April 13, 1943.  E. C. ROBES, JR.  2,316,456
CONVERTIBLE CARRIER EQUIPMENT
Filed April 16, 1941  4 Sheets-Sheet 1

INVENTOR:
Ernest C. Robes Jr.,
BY
ATTORNEYS

April 13, 1943. E. C. ROBES, JR 2,316,456
CONVERTIBLE CARRIER EQUIPMENT
Filed April 16, 1941 4 Sheets-Sheet 2

INVENTOR:
Ernest C. Robes Jr.,
BY Paul & Paul
ATTORNEYS.

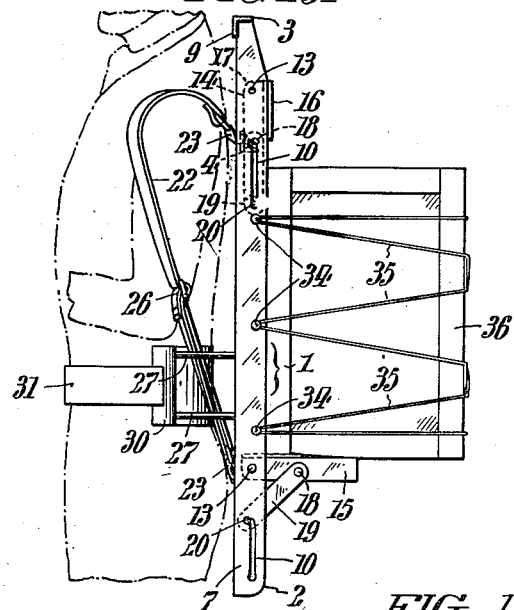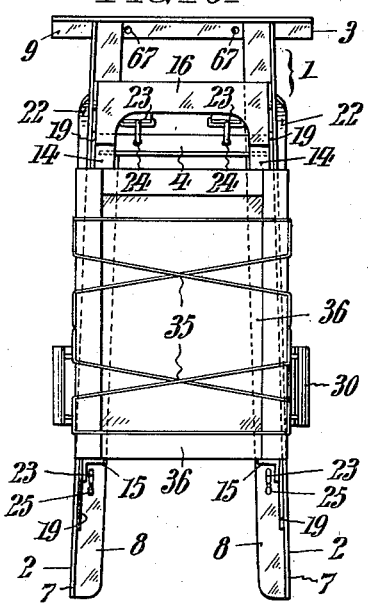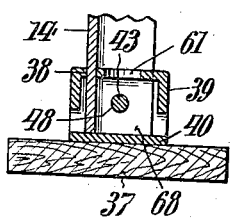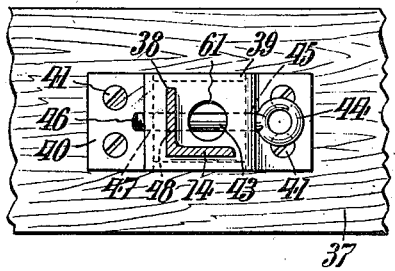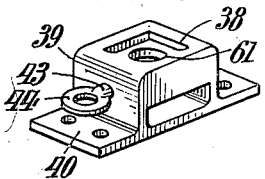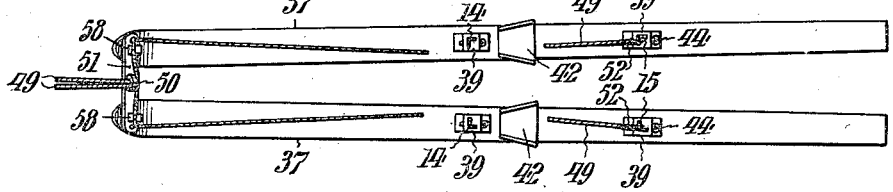

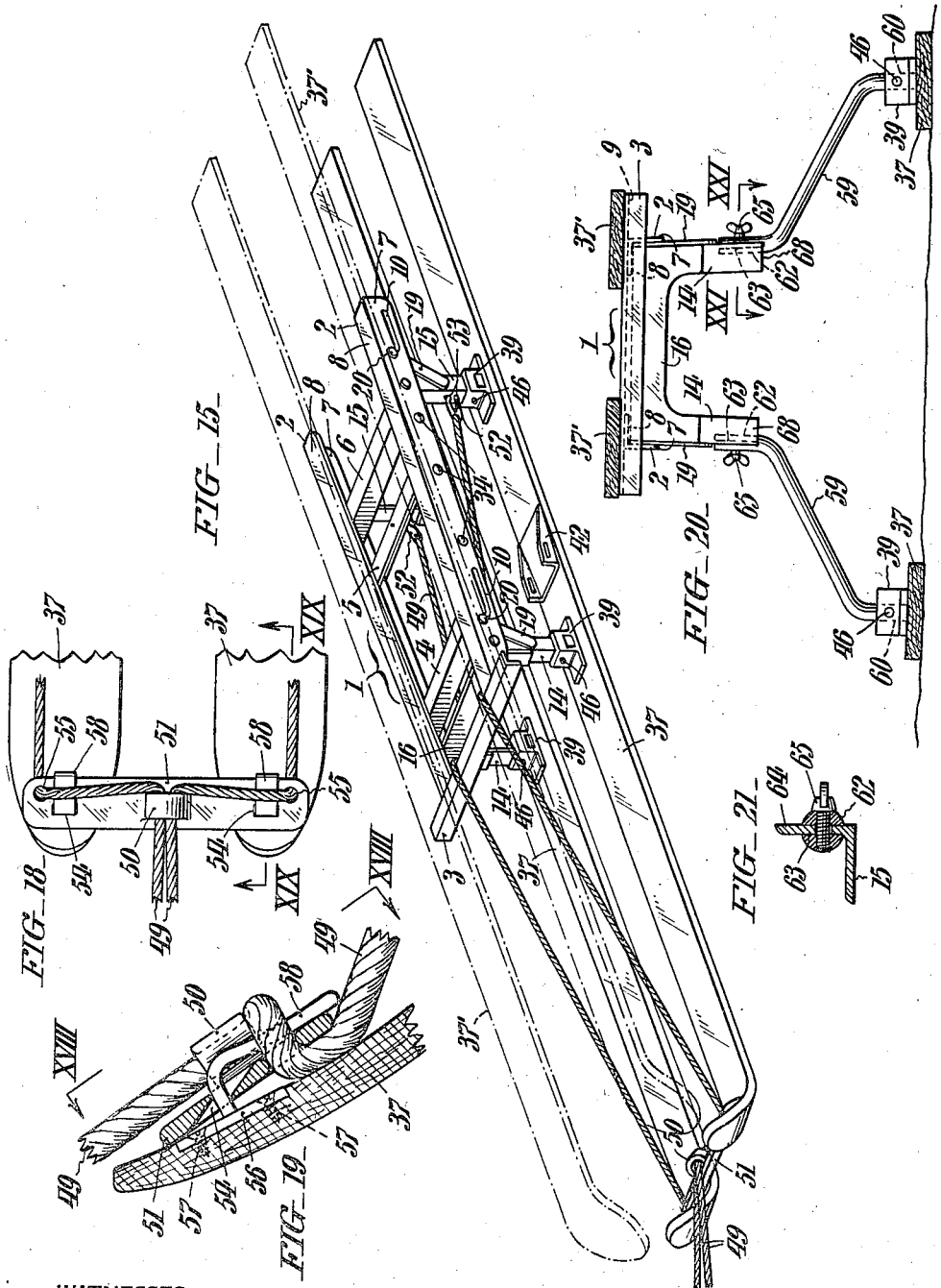

Patented Apr. 13, 1943

2,316,456

UNITED STATES PATENT OFFICE 2,316,456

CONVERTIBLE CARRIER EQUIPMENT

Ernest C. Robes, Jr., Etna, N. H., assignor of one-half to Fred P. Carr and Earle C. Gordon, Jr., both of Lebanon, N. H.

Application April 16, 1941, Serial No. 388,751

3 Claims. (Cl. 224—9)

This invention has general reference to convertible equipment designed to support articles for carriage by individuals without difficulty when hiking or marching, and arranged for easy adaptation for service as a conveyance for the transport of heavier loads, or ready usage as an emergency stretcher for the transport of an injured person.

More specifically, the present improvements relate to pack and supply carrying equipment designed for use by soldiers, mountaineers, hunters, woodsmen and others occupied in the open air for short, or longer, periods of time. In carrying equipment of the indicated species, it is highly desirable the same should be readily applicable to the person, as well as comparatively light, but sufficiently strong to accommodate the different purposes to which it may be subjected.

The fundamental aim of this invention is to provide a novel construction of burden carrier or device, preferably, for use by ski-troops and others for the comfortable conveyance of a sleeping pack, food, supplies, ammunition, machine guns, etc.; said carrier also being adapted for ready convertibility for use as a sled or an emergency stretcher, respectively, for the easy conveyance of a heavy load or the comfortable and safe transport of an injured or sick person.

Another aim is the provision of a convertible carrier of the type indicated in the preceding paragraph which is so designed that under ordinary walking or hiking conditions the load is comfortably sustained high on the shoulders, but when in use by persons wearing skis the load can be relatively lowered to ensure better balance and carriage; while in either of the stated positions no interference whatever is offered to the free movement of the wearer's arms or legs.

A still further aim of this invention is the provision of a convertible carrier device of the above noted type having a body yoke which is collapsible so as not to interfere with the load borne when said carrier is adapted for emergency usage, or the general transportation of loads.

While the foregoing definitions are indicative, in a general way, of the aims of this invention, other objects with ancillary advantages will be later on noted or explained; while it will be evident to those skilled in the art upon a full understanding of the construction, arrangement and usages of the means hereinafter fully disclosed, that said invention is susceptible of other embodiments or structurally modified forms coming equally within the terms and scope of the concluding claims.

In the accompanying drawings:

Fig. 1 is a view showing the convertible carrier device, of this invention, on the back of a person, wearing skis as means for normal travel over snow covered terrain, with the load high; and also indicating by dot-and-dash outline how the load may be lowered to accommodate travel in abnormal conditions or when it is desirable the load be lowered for stabilizing purposes.

Fig. 2, sheet 2, is a face view or front elevation of the carrier collapsed with the supporting means in position for application to the body of a person.

Fig. 5, sheet 3, is a view somewhat similar to the preceding but showing the carrier as adapted for transporting a case of ammunition, or with the weight high.

Fig. 6 is a rear elevation of the preceding figure, or as viewed from the right hand thereof.

Fig. 7, sheet 1, is a central longitudinal section through the carrier, of this invention, as initially opened up for emergency usage and ready for mounting on a pair of skis as runners therefor.

Fig. 8 is a side elevation of the carrier of this invention as converted into a temporary transportable stretcher for an injured person.

Figure 9:
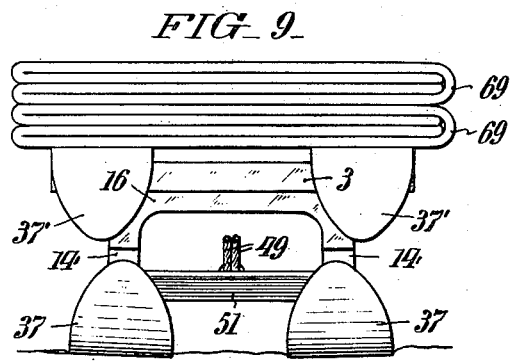

Fig. 9, sheet 2, is a larger scale front end elevation as viewed within the limits of the angled arrows IX—IX in Fig. 8.

Figure 10:
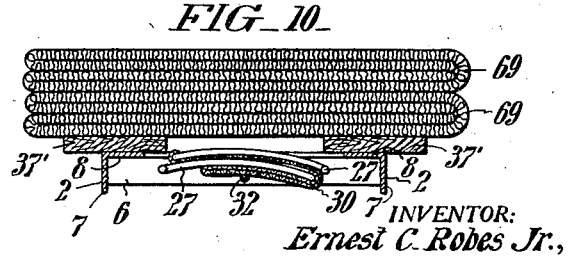

Fig. 10 is a cross section taken as indicated by the angled arrows X—X in Fig. 8.

Fig. 11, sheet 3, is a detail section taken approximately on the plane XI—XI in Fig. 8 and looking in the direction of the arrows.

Fig. 12 is a plan section taken as indicated by the angled arrows XII—XII in Fig. 8.

Fig. 13 is a perspective view of a foot-piece or socket device hereinafter fully explained.

Fig. 14 is a plan section taken as indicated by the angled arrows XIV—XIV in Fig. VIII.

Fig. 15, sheet 4, is a perspective view of the convertible carrier attached to a pair of skis and ready for lashing thereto any load or burden desired to be carried or transported, and with convenient draught means attached thereto.

Fig. 16, sheet 1, is a fragmentary detail of a leg bracing and locking means later on fully set forth.

Fig. 17 is a fragmentary part elevation and part sectional detail of a snap fastener for the draught means.

Fig. 18 is, sheet 4, a fragmentary plan view of a coupler guide means for the forward or toe portions of the skis when in use as runners for the convertible carrier; said view being taken as indicated by the angled arrows XVIII—XVIII in Fig. 19.

Fig. 19 is a vertical section on the plane XIX—XIX in Fig. 18.

Fig. 20 is a fragmentary view of a modified leg means for expanding the base of the carrier when transporting a bulky body; and, Fig. 21 is a detail section, on a larger scale, taken on the plane XXI—XXI in the preceding view.

In describing the form of this invention exemplified, in the four sheets of drawings herewith, specific terms will be employed for the sake of clarity; but it is to be understood the scope of said invention is not thereby limited, each such term being deemed to embrace all equivalents which perform the same function for an analogous purpose.

Referring in detail to the drawings, and more particularly to Figs. 1-4, inclusive, 7 and 15, the improved convertible carrier device of this invention comprises a frame, comprehensively designated by the reference character 1, said frame including longitudinal spaced members 2, preferably of angle-section metal, connected together by a similar section component or cross-tie 3 at one end, with intermediate paralleling braces 4, 5 and 6, of like character, the latter two being spacially disposed inwardly with respect to the other end of the frame 1. It is to be particularly observed, the longitudinals or angle section side members 2 are reversely disposed with the outer flanges 7 vertical and the inner flanges 8 horizontal; said members 2 being rigidly secured to the inner flange 9 of the end cross-tie 3, as well as being equally spaced inward with respect to the extremities of said cross-tie. In addition, and as readily understood from Figs. 1, 5, 7 and 16, the vertically located flanges 7 of the side members 2 are provided with longitudinal slots 10 having curved ends 11 defining latch abutments 12, the purpose whereof will be fully set forth hereinafter. Still further, the braces 4, 5 and 6 are of graduated length so that the side members 2 are opposingly inclined outwards, with respect to the points of attachment to the cross-tie 3, evenly to the right and left-hand of the longitudinal median of the frame 1, as clearly shown in Figs. 2 and 3 more particularly; while all of the parts so far described are securely connected together at the meeting points by riveting or spot welds—not shown, in an obvious manner, so that said frame as a unit is rigid throughout.

Conveniently pivoted, as by headed studs 13 for example, to and intermediate the flanges 7 of the side members 2, are angle section front and rear pairs of legs 14, 15, respectively, bridged and rigidly braced at the upper parts by permanently attached saddle plates 16, while said legs have their upper extremities rounded-off at 17 for a purpose later explained. Pivoted at 18 to the respective legs 14, 15 are links 19 having at their other ends headed studs 20 with their shanks engaged through the slots 10 in the frame side flanges 7. Now it will be readily seen on an inspection of Figs. 4 and 16, more particularly, that the respective pairs of legs 14, 15 when collapsed fold into the frame side members 2 on the studs 13, with the studs 20 at the extremities of the slots 10, remote from the curved ends 11. To move the legs 14, 15 into position for supporting the frame 1, as shown in Figs. 7, 8 and 15, they are simply swung outwardly through an angle of substantially ninety degrees and during such movement the studs 20 ride along the slots 10 until reaching the curved ends 11 thereof, whereupon by slightly forcing said legs beyond the vertical relative to the axis of said studs (as indicated by the dot-and-dash line position a at the left-hand of Fig. 16) the ends of the links 19 bearing the studs 20 are slightly strained with resultant snap engagement of the shank portions of said studs over the latch abutments 12, or into locked position; it being obvious that a slight degree of freedom is provided at the pivots 18 to permit the action just described. It will now be apparent that the angular upper ends 21 of the legs 14, 15 are in supporting abutment below the flanges 8 of the frame 1, while the links 19 are so positioned to brace said legs against accidental collapse. To collapse the legs 14, 15, it will be self-evident the operations just described are reversed with the leg roundings 17 aiding easy folding inwards of said legs relative to the frame 1.

In order that the device or frame 1 may be conveniently and comfortably carried, it is provided with appropriate harness straps 22, having latch hooks 23 at their ends for snap engagement in holes 24, 24, respectively provided in the brace 4 and side members 2, whereby said frame is supported from the shoulders of the carrier, while the straps 22 are fitted with adjuster means 26 for varying their length. In addition, the frame 1 is fitted with a pair of arcual bail-like elements 27 having the free ends of the leg portions reversely angled to provide axes 28, 29, respectively sprung into pivotal engagement in holes provided for the purpose in the laterally paralleling flanges of the braces 5, 6, see Figs. 3 and 4 to best advantage. Suitably attached intermediate the bail elements 27 is a wide back or hip band 30, as well as an adjustable front waist belt 31; while a longitudinally disposed rod 32 is secured centrally between the braces 5, 6 for a purpose later explained.

Figure 1:
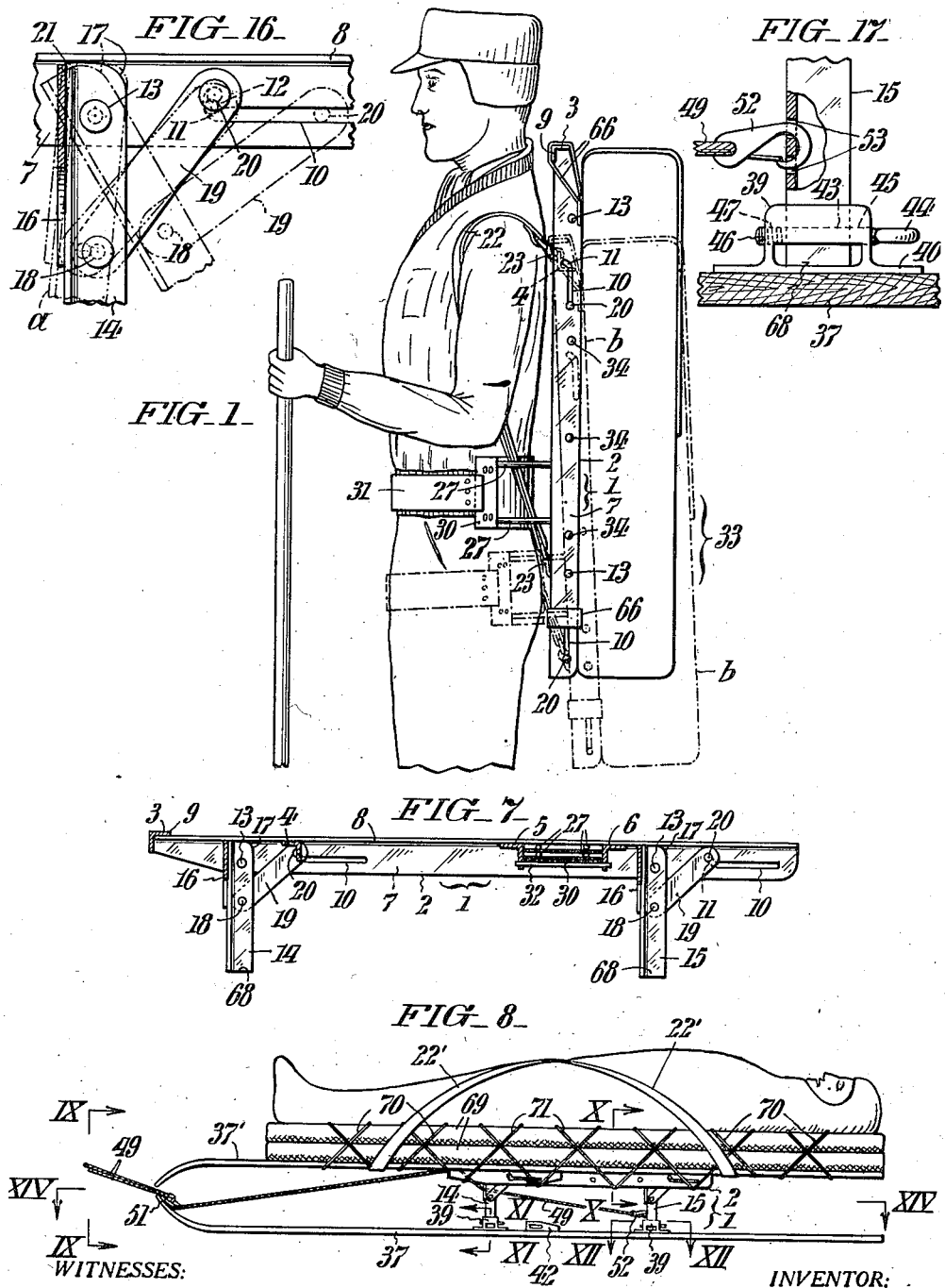

For carrying a conventional sleeping bag, provision kit and hiking equipment, as indicated comprehensively by the reference 33 in Fig. 1, the frame 1 is provided with spaced buttons 34 for lashing such equipment thereto by appropriate thongs 35, Figs. 5 and 6, in an obvious manner.

When the device or frame 1 is to be used for carrying a heavy load such for instance as a case 36, Figs. 5 and 6, of ammunition or canned goods, the rear pair of legs 15 are opened out and said case lashed to the frame 1 by thongs 35, as aforesaid, when it will be readily understood the dead weight of the load is substantially eased insofar as gravity influence on the person is concerned with appreciable relief from overbalancing strain. Should the load or case 36 be too heavy for normal carriage, both pairs of legs 14, 15 are opened out and locked by the latch abutments 12, as before described, when the device or frame 1 is mounted on a pair of skis 37 by passing the free ends of said legs through complemental angular slots 38 in the upper wall of rectangularly contoured socket devices 39, Figs. 11-13, having an apertured base flange 40, whereby they are securable, as by wood screws 41, to such skis. These socket devices 39 are, preferably, mounted on the skis 37 spatially in advance and to the rear of the conventional toe pieces 42, so as to offer no interference to the normal use of such skis while providing a simple means for their quick conversion into runners for the carrier device 1 when adapted as a sled for transporting a heavy burden. The base flange 40 of each socket device 39 is, preferably, solid for seating thereon of the lower extremity of the associated leg 14 or 15 so as to prevent abrasion of the ski 37. In order to attach the leg 14 or 15 in the socket device 39, use is made of a lock pin 43 having an eye 44 at one end, said pin being passed through a hole 45 in one wall of said device with its free end threaded at 46 for engagement in a screw hole 47 provided for the purpose in the opposing socket wall, it being obvious an axially alignable hole 48 is provided through leg 14 or 15 for passage of said pin to effect the socketed connection.

For hauling the converted carrier device 1 as set forth in the preceding paragraph, use is made of the means now to be described, said means comprising a tow-line 49 preferably doubled upon itself and passed through the medial eye 50 of a cross-tie 51, Figs. 18 and 19, removably applied to the forward portions of the skis 37, with the free ends having attached latch hooks 52, best shown in Fig. 17, for snap engagement in vertically-spaced holes 53 provided for the purpose in the rear legs 15, see Figs. 14 and 15. The cross-tie or connector link 51, it will be seen, is provided in addition to the eye 50 with inclined slots 54 and outwardly related holes 55 through which the free portions of the tow-line 49 are threaded as shown in Fig. 18 and passed over the frame cross-tie 3 to their points of attachment in the leg holes 53. The tie or link 51 is removably applied to the skis 37 preferably by aid of inset plates 56, secured to the ski toe portion by screws 57, said plates having rigid and rearwardly directed spatially related tongues 58 engageable through the inclined slots 54, as shown in Fig. 19. Now it will be seen that by threading the tow-line 49 through the link eye 50 and holes 55 that the link 51 is clamped to the forward ends of the skis 37 in a manner effective to prevent relative spatial movement; while the tow-line 49 is applied and anchored in a way conducive to maintain the carrier device 1 properly stabilized with the skis 37 restrained from lateral separation and objectionable tilting when drawn over uneven snow covered terrain.

In some cases, where it is desirable the converted carrier device 1 shall have a wider base for better stabilizing a bulky load, use is made of the cranked leg-extensions 59 shown in Figs. 20 and 21, said extensions being preferably round section rods with the lower end portions 60 adapted for seating in the socket devices 39 by passage through corresponding holes 61, Figs. 11–13, provided in the top walls of said devices and attachment thereto by the lock pins 43 engaged through diametric holes therein, in an obvious manner. On the other hand, the upper end portions 62 of the leg extensions 59 are diametrically slotted at 63 for reception of the leg side flange portions 64 and secure retention therein by wing screws 65 as readily understandable by those conversant with the art and inspection of Fig. 21, more particularly.

Figure 2:
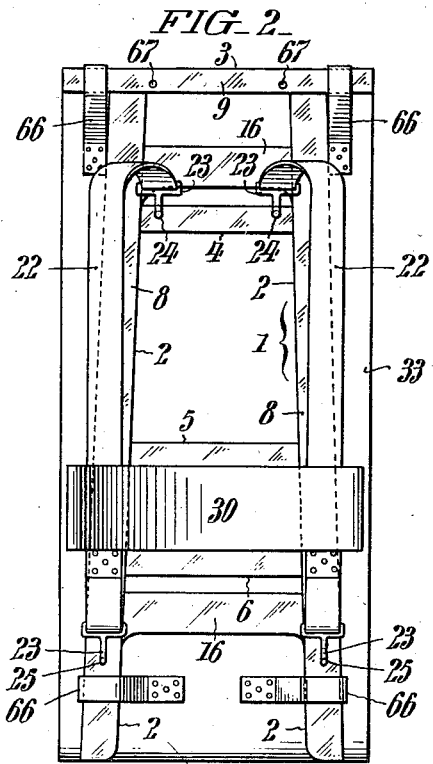
Figure 3:
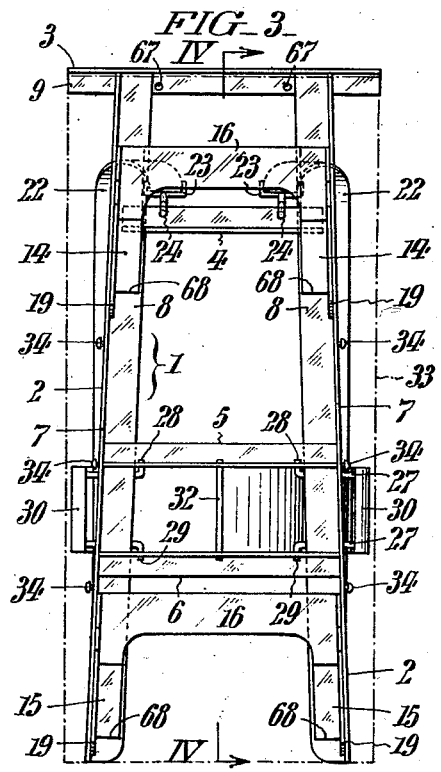
Fig. 3 is a rear view of the preceding illustration.
Figure 4:
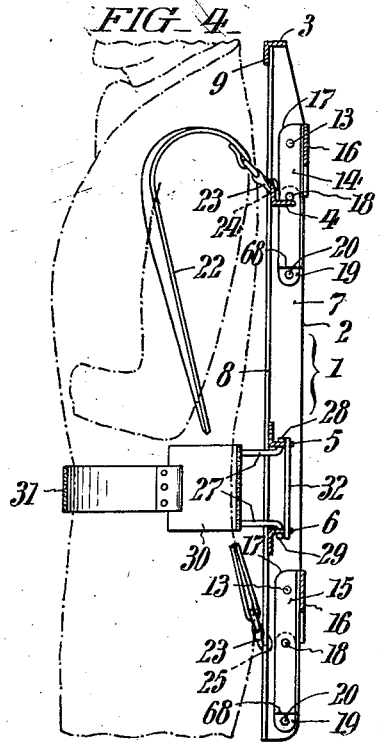
Fig. 4 is a longitudinal section on the plane designated by the angled arrows IV—IV in Fig. 3, with a portion of the wearer's body indicated by dot-and-dash lines.

Having described the structure of the improved convertible carrier device 1, its uses and varied adaptations are briefly explained as follows: Assuming first that the device 1 is to be used for carrying a sleeping pack 33, as indicated in Figs. 1, 2 and 3, the same is attached thereto by passing the free outer portions of the cross-tie 3 and the free ends of the side members 2 through suitable loops 66, provided for the purpose on said pack, with the harness straps 22 over the wearer's shoulders, and the hip band 30 across the hollow of the back, whereupon the waist belt 31 is adjusted and secured. It will now be clearly evident on examination of Fig. 1, more particularly, that the device 1 (with the sustained load) is supported away from actual contact with the back through the medium of the yoke or hip band means 27, 30 and harness straps 22, thereby eliminating any interference to free movement of the arms and legs. It is also to be noted that by providing additional holes 67 in the cross-tie 3 with which the upper harness latch hooks 23 are engageable, the carrier device 1 and sustained load may be lowered to the position indicated by dot-and-dash outline b in Fig. 1 to better balance and steady said load, or to carry the dead weight of the load lower relative to the body when desirable or expedient; while the harness straps 22 being adjustable as regards their length afford provision for ready adaptation of the carrier device 1 to different widths across the shoulders and so forth.

Another important feature to be observed is that by constructing and mounting the arcual elements 27 with the attached band 30 as described and shown, said parts are readily collapsible, and sustainable by the rod 32, planarly flat within the confines of the device 1, for shipment or when said device is used as a sled, as readily understandable from Figs. 7 and 10. In addition, it is to be remarked the legs 14, 15 are also foldable within the device 1, Figs. 3 and 4; while particular attention is directed to the even tapering relation of the side members 2 relative to longitudinal median of said device with the corresponding inclination of the legs 14, 15, whereby their rectangularly related ends 68, Fig. 3, when said legs are opened out, assume reverse or outward and even angular inclination relative to the horizontal so that the skis 37, when attached, are similarly tilted outward and slightly upwards, see Fig. 9. This angular disposition of the skis 37 substantially aids progression as well as effectively preventing sidewise movements; or, otherwise expressed, by disposing and arranging the parts 2, 14, 15 and 37, as just set forth, the carrier device 1 when converted into a sled is advantageously restrained to direct progression except its course be shifted as desired by the person towing or steering the same.

When it is desired to convert the improved carrier device 1 of this invention into a means or sled for transporting supplies, ammunition, machine guns, etc., the legs 14, 15 are opened out and rigidly held, in angular relation with respect to the device 1, by the links 19 and associated studs 20 engaging over the latch abutments 12; whereupon a pair of skis 37 are applied by engagement of the leg lower ends in the socket devices 39 and to which they are secured by the lock pins 43 as hereinbefore explained. The tow-line 49 is next applied by threading through the eye 50 and holes 55, of the connector link 51; with the terminal latch hooks 52 snapped through the holes 53 in the legs 15; whereupon said link 51 is applied to the ski toe attachment tongues 58 and the tow-line 49 drawn taut to secure the link 51 in position. The load can now be readily lashed on the device 1 and the whole drawn by aid of the tow-line 49 in an obvious manner.

For transporting an injured or sick person as indicated in Fig. 8, the skis 37' worn by the latter for instance, are removed and inverted, whereupon a folded sleeping bag or bags 69 are laid lengthwise on said inverted skis and lashed thereto by thongs 70. The improvised stretcher thus formed is laid on top of the device 1 and lashed thereto, in the desirable lengthwise location by thongs 71, whereupon the injured or sick person is laid thereon and conveniently restrained from slippage by use of the harness straps 22', crossed as indicated in Fig. 8 and suitably hooked to the skis 37' or the carrier device 1 in an obvious manner, when it will be apparent that one man, by drawing on the tow-line 49, can easily transport the injured or sick person from a normally inaccessible place to a point of safety, or to a location for transference to an ambulance. It will also be self-evident that the injured or sick person can be easily removed from the device 1 and carried by aid of the improvised stretcher 37', 69 and 70, into an accessible place for emergency or other treatment by simply removing the strap or straps 22'.

From the foregoing the merits and usefulness of this invention should be clearly appreciated, while it is to be understood the form herein disclosed is by way of example only, inasmuch as changes and modifications are contemplated, or possible, within the scope of the following claims, without sacrifice of any of the advantages hereinbefore pointed out.

Having thus described my invention, I claim:

1. In a convertible carrier device the combination of a rigid frame fabricated of corresponding section elements, said frame including convergent side members having a tie component across and projecting beyond the closer related ends of said members; parallel braces between the side members with the brace remote from the tie component spaced inwards from the wider related ends of said side members; spaced pairs of similar section legs pivoted to and normally collapsed within the frame side members; means whereby the respective pairs of legs are arrestable in frame supporting position; and means cooperative with the respective leg free ends to adapt the device for hauling purposes.

2. The combination of claim 1, wherein an extension is adapted to each leg, each such extension consisting of an approximately crank-shaped element having the upper portion diametrically slotted for coaction with the leg lower portion, and means rigidly clamping said slotted upper portion of the extension to the leg, with the element's lower portion extending outwardly, whereby the supporting base of the carrier device is substantially widened.

3. The combination of claim 1, wherein the respective pairs of legs when folded converge longitudinally in conformity with the longitudinal disposition of the frame side members, the free extremity of each leg lying in a plane which is at right angles to the planes of the sides of the leg, so that, when the device is adapted for hauling, the legs diverge outwardly and downwardly and the planes of their extremities are reversely pitched slightly upwards and outwards relative to the horizontal, causing a corresponding pitch of the leg cooperative means to prevent lateral skidding.

ERNEST C. ROBES, Jr.